No. 740,198. PATENTED SEPT. 29, 1903.
H. F. SPIEGEL.
HORSE DETACHER.
APPLICATION FILED MAY 20, 1903.
NO MODEL.
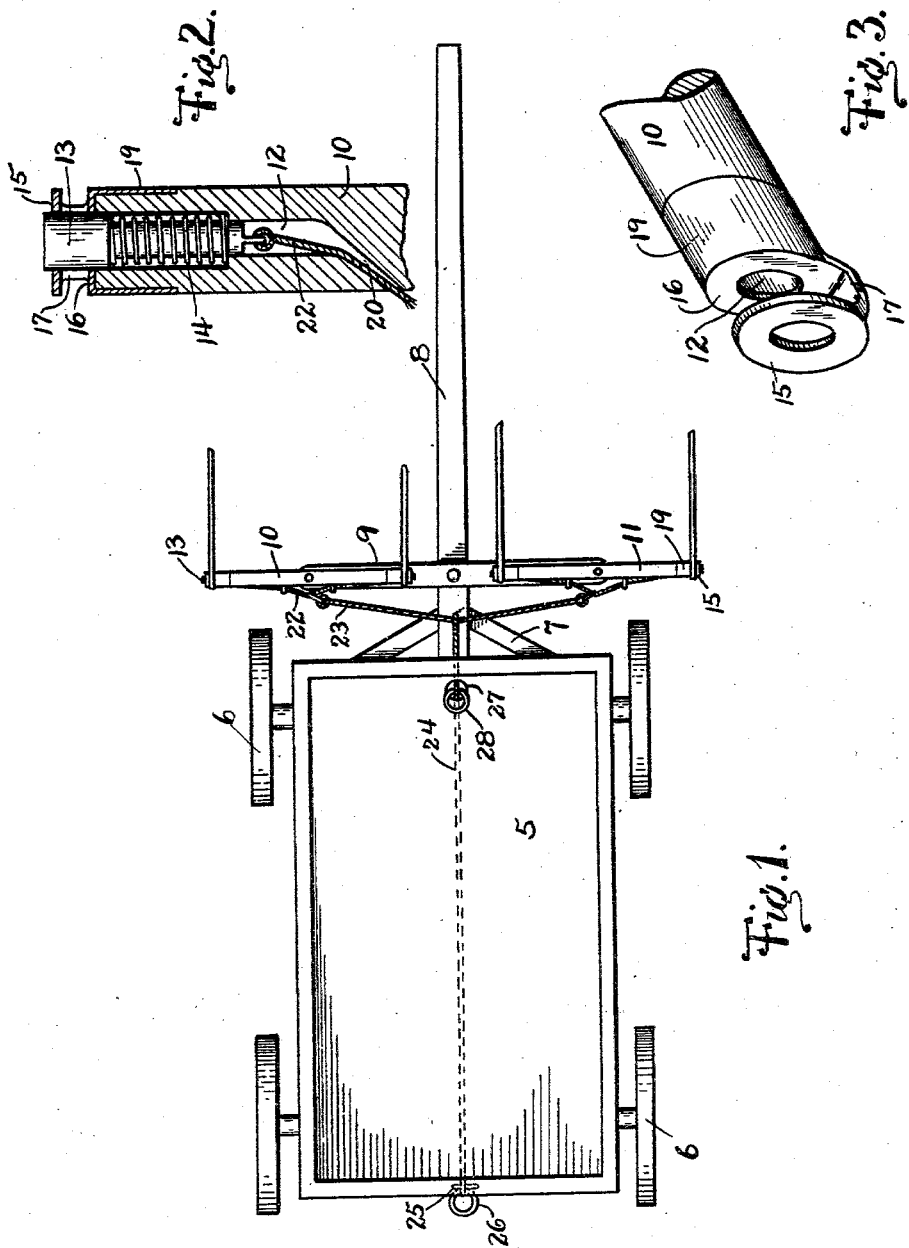
Witnesses
Charles Morgan
F. Leonard
Inventor
H. F. SPIEGEL.
by
Chandler & Chandler
Attorneys No. 740,198. Patented September 29, 1903.

UNITED STATES PATENT OFFICE.

HARRY F. SPIEGEL, OF KULM, NORTH DAKOTA.

HORSE-DETACHER.

SPECIFICATION forming part of Letters Patent No. 740,198, dated September 29, 1903.

Application filed May 20, 1903. Serial No. 157,956. (No model.)

*To all whom it may concern:*

Be it known that I, HARRY F. SPIEGEL, a citizen of the United States, residing at Kulm, in the county of Logan, State of North Dakota, have invented certain new and useful Improvements in Horse-Releasers; and I do hereby declare the following to be a full, clear, and exact description of the invention, such as will enable others skilled in the art to which it appertains to make and use the same.

This invention relates to horse-releasers for releasing the traces from the swingletree; and it has for its object to provide a construction which may be operated from within the vehicle or from behind the vehicle, other objects and advantages of the invention being understood from the following description.

In the drawings forming a portion of this specification, and in which like numerals of reference indicate similar parts in the several views, Figure 1 is a top plan view of a vehicle equipped with the present releasing mechanism. Fig. 2 is a horizontal section through one end of a swingletree and illustrating the mechanism for releasing the traces. Fig. 3 is a perspective view of the clip at one end of a swingletree.

Referring now to the drawings, there is shown a vehicle including a body 5, having wheels 6 and supporting-axles, and connected to the front axle are the usual hounds 7, to which is connected a pole 8, carrying a doubletree 9. On the doubletree 9 are mounted the swingletrees 10 and 11, which are duplicates. In each end of each swingletree is formed a longitudinal passage 12, in which is a plunger 13, which is held normally with its outer end projected from the swingletree by means of the helical spring 14. Upon each end of each swingletree is a clip, including the disks 15 and 16, at the ends of a connecting-web 17, the web being bent upon itself so that the disks are parallel and in axial alinement, and centrally of the disks are perforations 18, which receive the end of the bolt or plunger 13 when the latter is projected from the end of the swingletree. The end of the trace to be connected to the swingletree is passed between the disks 15 and 16, so that the eye of the trace alines with the perforations of the disks, and the bolt or plunger, which has been previously retracted, is released, so that it engages through the eye and the trace is held to the swingletree. The clip is connected to the end of the swingletree through the medium of a ferrule 19, formed upon or attached to the disk 16. In the rear side of each swingletree and communicating with the longitudinal passages thereof are the branch passages 20. When the horse is to be released from either swingletree, the bolts or plungers of that swingletree are retracted, and to retract the bolts a cord 22 is provided for each of the swingletrees and has its ends passed through the branch passages and the main passages and attached to the inner ends of the bolts or plungers, so that by pulling upon the central portion of the cord both bolts or plungers will be retracted.

In the use of two swingletrees, as illustrated, a cord 23 has its ends attached to the central portions of the first-named cords, and a fourth cord is attached to the central portion of the cord 23, this fourth cord 24 being passed rearwardly beneath the body of the vehicle and through a guide 25 at the rear thereof, where it is attached to a ring 26. In the floor of the vehicle next to the dashboard is an opening 27, and the cord 24 is bent upon itself, and the bight thus formed is passed through the perforation in the floor of the vehicle, where the cord passes through a ring 28. With this arrangement if the ring 28 is raised the cord 24 will be drawn to retract the bolts or plungers, at which time the ring 26 will lie close against the guide 25 and prevent withdrawal of the free end of the cord therethrough. When the ring 26 is pulled, the cord 24 is drawn through the ring 28, the latter then acting as a guide for the cord to prevent lateral displacement thereof as well as to keep the cord 24 from dropping or sagging. It will be understood that where a single draft-animal is hitched the cord 24 will be attached directly to the cord 22 on the swingletree, there of course then being only one swingletree used.

What is claimed is—

The combination with a vehicle including a body having an opening through the floor thereof, of a swingletree having trace-holding devices including bolts and means for holding them yieldably in operative positions, a retracting-cord connected with the bolts, a guide at the rear end of the body of the vehicle, through which the cord is passed, a handle attached to the rear end of the cord, said cord being bent upon itself to form a bight portion which is passed upwardly through the opening in the floor of the body, and a ring engaged through the bight portion of the cord above the floor of the body, and through which the cord is free to pass.

In testimony whereof I affix my signature in presence of two witnesses.

HARRY F. SPIEGEL.

Witnesses:
M. OLAF HAUSKEN,
CHRIST HIEB.